(No Model.)
M. A. MARTINDALE.
IRRIGATING AGRICULTURAL AND OTHER LANDS.
No. 272,728. Patented Feb. 20, 1883.
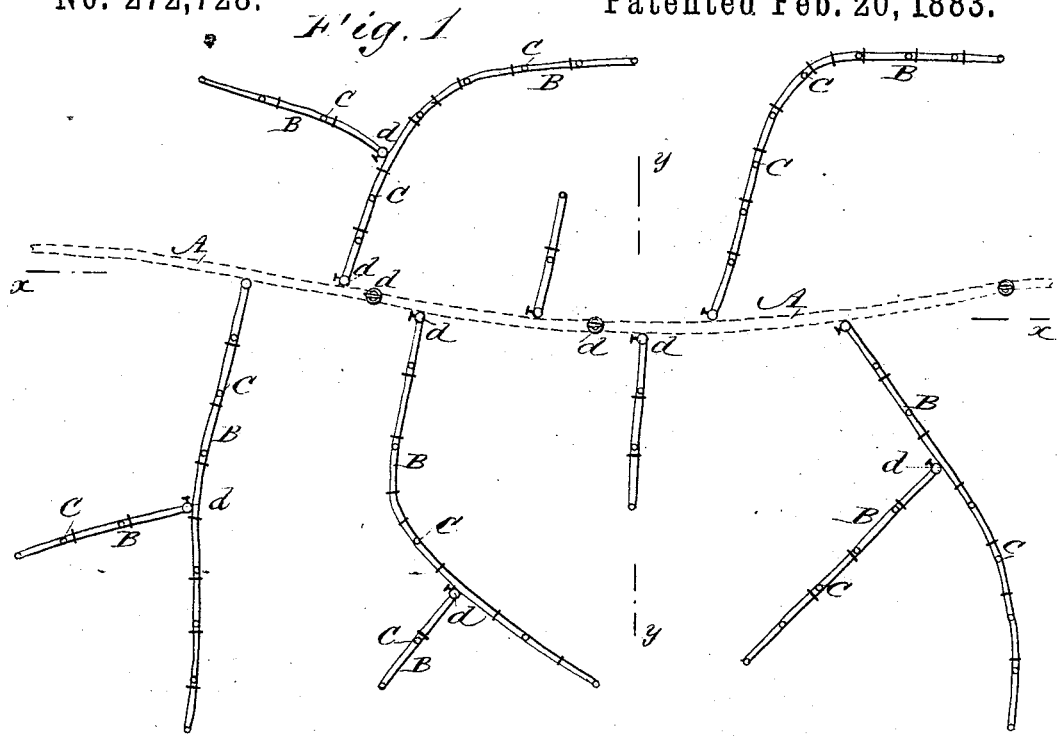
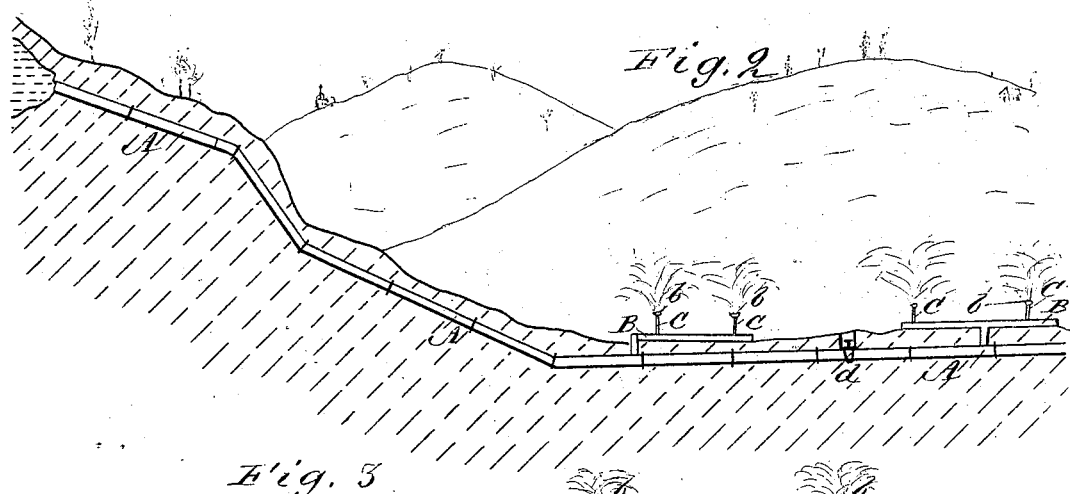
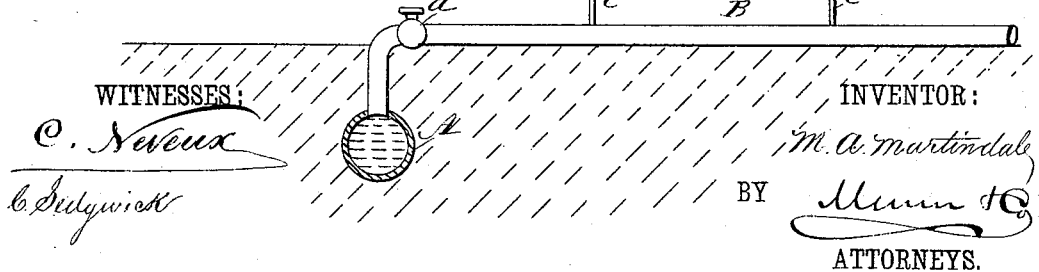
WITNESSES:
C. Neveux
C. Sedgwick
INVENTOR:
M. A. Martindale
BY Munn & Co.
ATTORNEYS.

UNITED STATES PATENT OFFICE.

MOSES A. MARTINDALE, OF GEORGETOWN, COLORADO.

IRRIGATING AGRICULTURAL AND OTHER LANDS.

SPECIFICATION forming part of Letters Patent No. 272,728, February 20, 1883.

Application filed July 31, 1882. (No model.)

*To all whom it may concern:*

Be it known that I, MOSES A. MARTINDALE, of Georgetown, in the county of Clear Creek and State of Colorado, have invented a new and useful Improvement in Irrigating Agricultural and other Lands, of which the following is a full, clear, and exact description.

This invention has for its object the irrigation of agricultural lands in regions where water is scarce or very unevenly distributed; and to this end it consists in the combination, with a main pipe leading from a reservoir, and provided with valves at suitable distances, of branch pipes provided with valves at their junction with the main and each other and upright pipes projecting from the branch pipes, and provided with sprinkling-distributers on their upper ends, all as hereinafter more fully set forth.

Reference is to be had to the accompanying drawings, forming part of this specification, in which similar letters of reference indicate corresponding parts in all the figures.

Figure 1 represents a plan of a main and system of branches with distributing attachments in illustration of my invention; Fig. 2, a vertical section in direction of the length of the main on the line $xx$ in Fig. 1; and Fig. 3, a vertical transverse section in part and upon a larger scale in direction of the line $yy$, Fig. 1.

A in the accompanying drawings indicates a main pipe deriving its supply of water from a fissure or cavity in the side of a mountain, or which may be laid several miles up the mountain creeks, and also several miles down through the valley land. Connected with this main pipe is a net-work or series of branch or lateral pipes, B, of smaller diameter than the main pipe for conducting the water to wherever it may be required for growing crops. Such system of pipes can cross all kinds of lands with impunity, and, if necessary, the main pipe be buried under the ground when passing through valuable farms or property, and the branch pipes be laid on the bare ground or otherwise, as desired. Mounted upon these lateral pipes, at suitable distances apart, are short upright pipes C, provided with sprinkling-distributers $b$ on their tops, for scattering the water evenly and continuously in the form of sprays or showers over the land. Cocks or valves $d$ are fitted to the main pipe A at different points in its length, to restrict the supply of water to certain localities, and the branch pipes B at their junction with the main pipe and with each other are similarly provided with stop-cocks or valves $d$, for a like or analogous purpose.

The water-supply may in every case be a natural one, and therefore inexpensive, and as mountain streams are generally small but rapid, flowing with more water in the warm months, reservoirs of large area may be constructed in the mountain gulches for husbanding a full supply of water for large areas of land, besides, if desired, and in case of a surplus, furnishing towns and cities with water or driving motors connected with different mechanical industries.

I am aware that a system of underground pipes radiating from a central reservoir and provided with hydrants to which a hose is adapted to be attached has heretofore been employed, and I am also aware that a system of perforated pipes laid upon the surface of the ground and radiating from a central reservoir for irrigating purposes is not new, and I therefore do not claim such inventions.

Having thus fully described my invention, what I claim as new, and desire to secure by Letters Patent, is—

The combination, with the main pipe A, leading from an elevated reservoir, and provided with valves $d$ at suitable distances, of the branch pipes B, provided with the valves $d$ at their junction with the main and with each other, and the upright pipes C, projecting from the branch pipes and provided with sprinkling-distributers $b$ on their tops, substantially as and for the purpose set forth.

MOSES A. MARTINDALE.

Witnesses:
RICHD. A. POMEROY,
L. C. McKENNEY.